Figure 1:
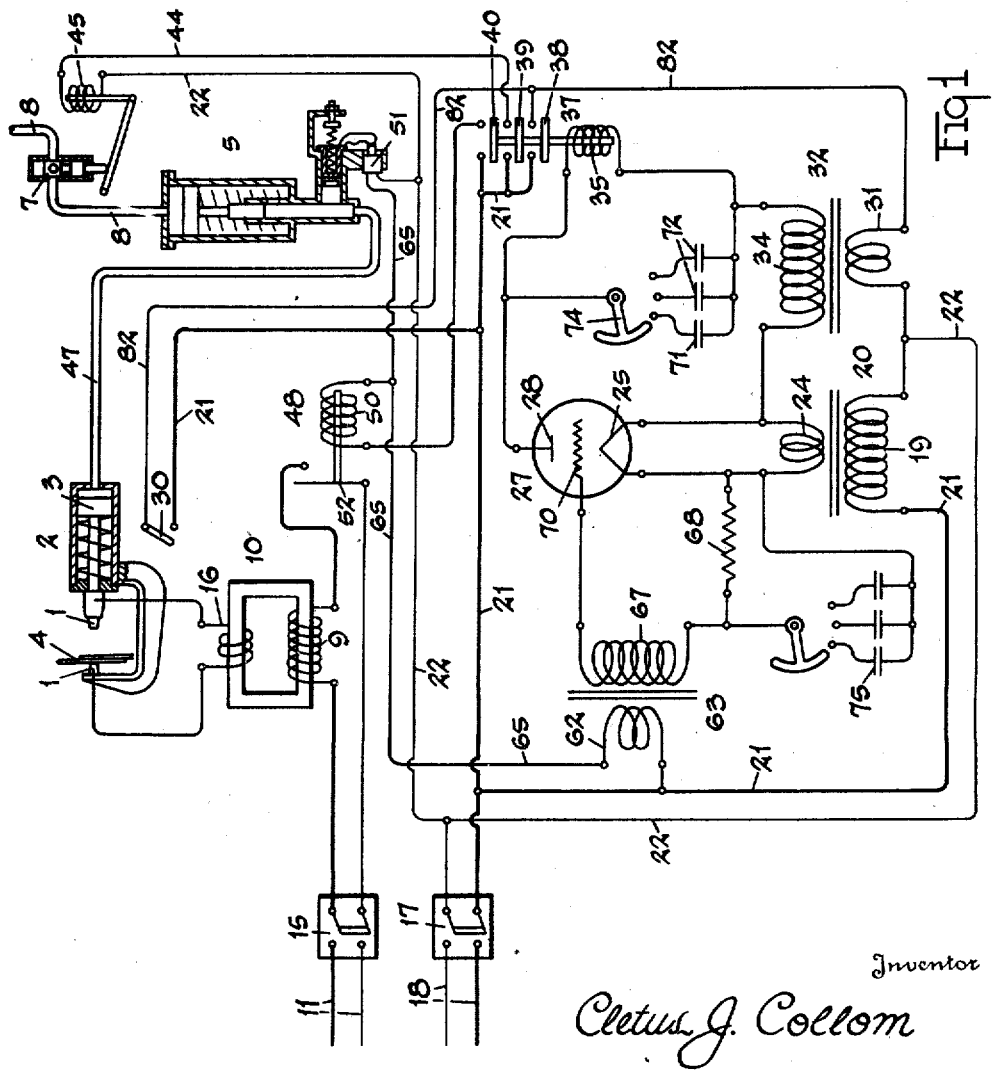

July 7, 1942.  C. J. COLLOM  2,289,320
ELECTRIC CONTROL APPARATUS
Filed Aug. 3, 1938  4 Sheets-Sheet 1

Inventor
Cletus J. Collom
By [signature]
Attorney

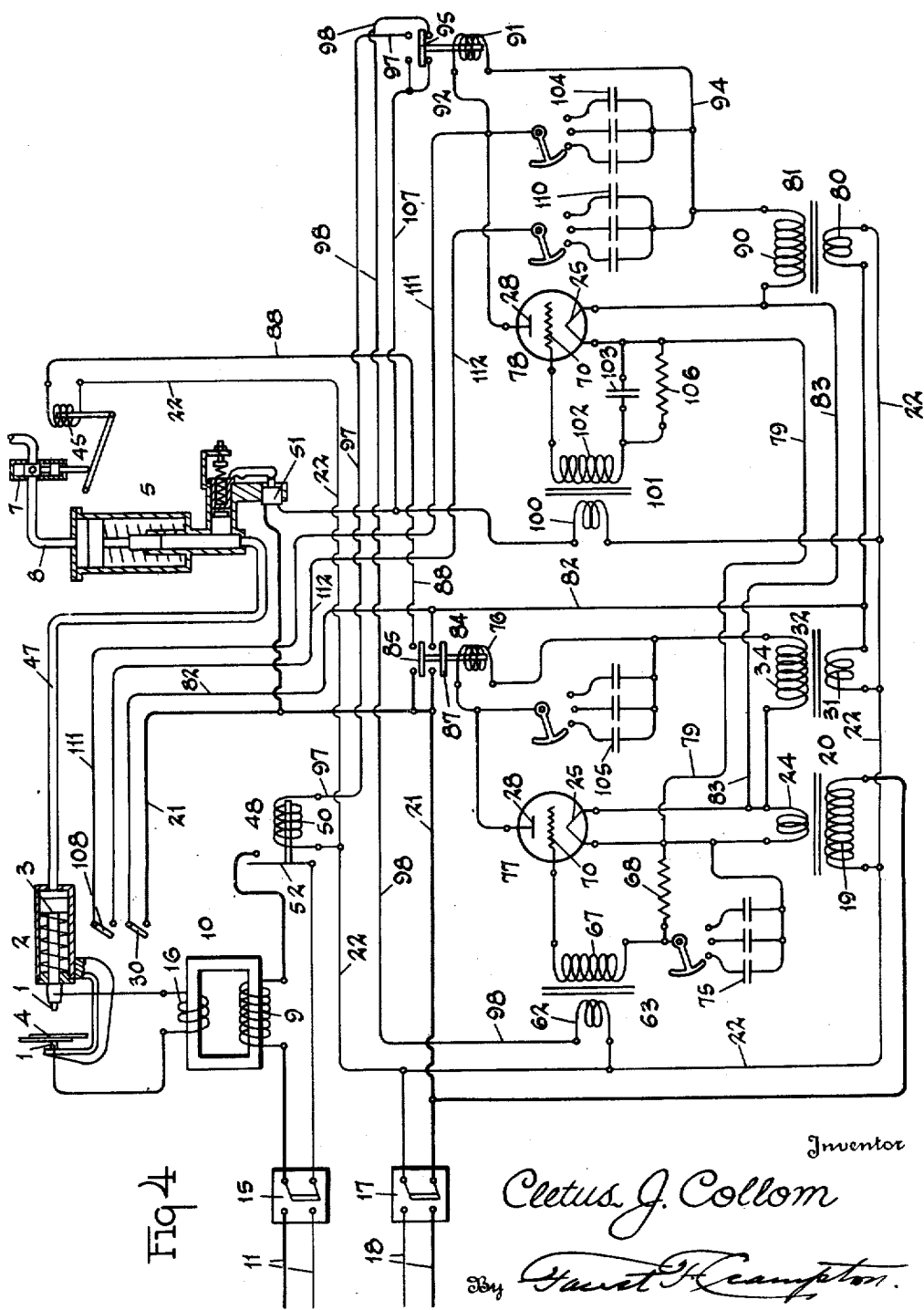

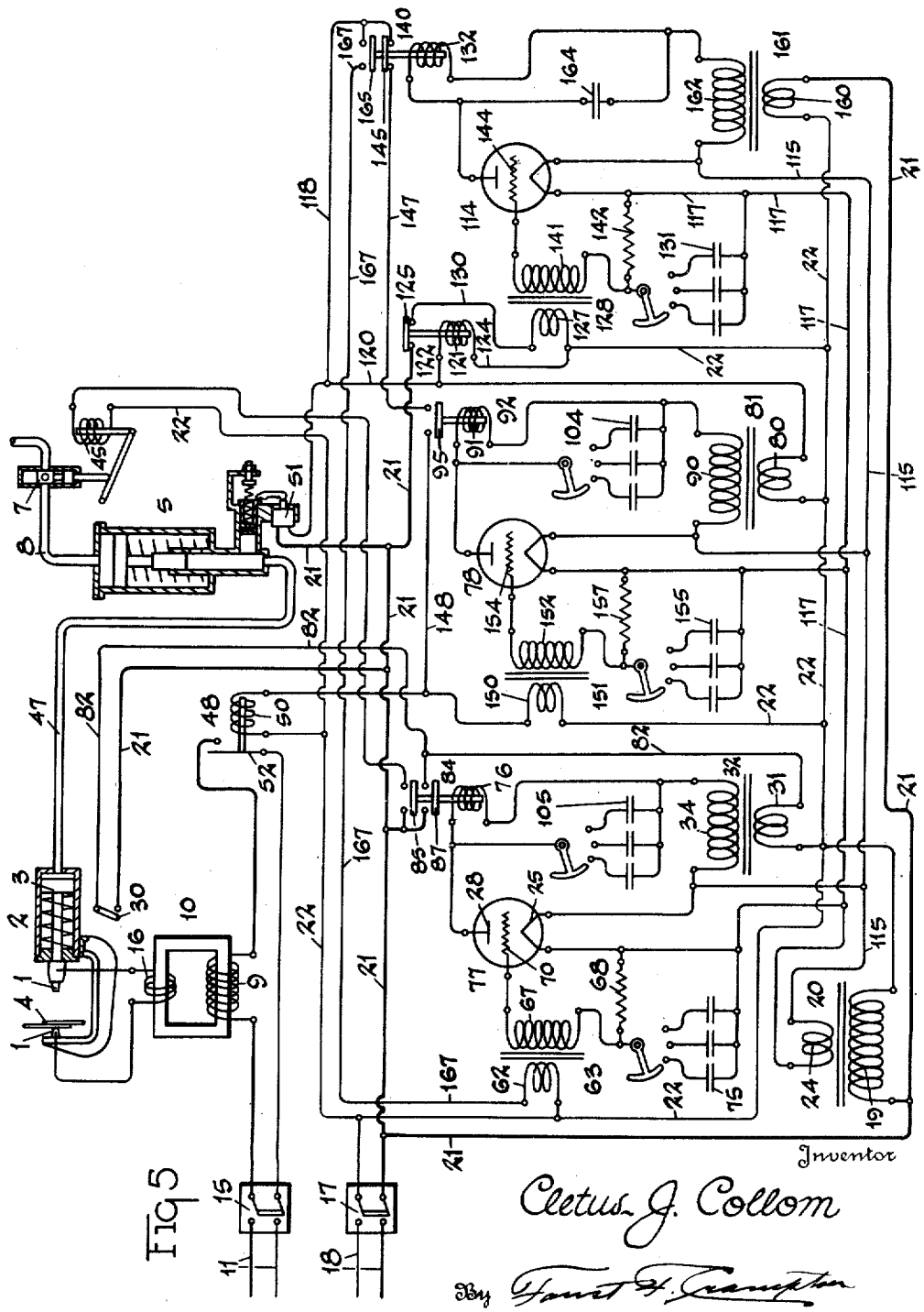

Patented July 7, 1942

2,289,320

UNITED STATES PATENT OFFICE 2,289,320

ELECTRIC CONTROL APPARATUS

Cletus J. Collom, Detroit, Mich., assignor to Weltronic Corporation, Detroit, Mich., a corporation of Michigan Application August 3, 1938, Serial No. 222,825

25 Claims. (Cl. 250—27)

My invention has for its object to provide a means for controlling intervals of operation of a device, or of one or more parts of a machine or apparatus, by the flow of predetermined quantities of electricity in interdependent circuits. The invention may be used for controlling apparatus and devices of different forms and which are used for different purposes.

The invention provides means for producing flow of dielectric currents from different sources, at predetermined quantity rates, for producing controlled operating and non-operating periods of a device, or a functioning element, or each of a plurality of functioning elements of a machine, during which the device or parts of the machine perform the particular functions for which they are designed in a desired timed relation.

The invention has for its object to provide other features and to produce other advantages, which will appear from the following description and upon examination of the drawings. The invention may be contained in apparatus of different forms for controlling devices and machines of different forms and to illustrate a practical application of the invention, I have selected three forms of electric control apparatus used for controlling a welding apparatus, as examples of embodiments of the invention, and shall describe the three forms of control apparatus which are used for causing the parts of the welding apparatus to perform their distinctive functions. The apparatus are shown in the accompanying drawings.

The invention may be adapted not only for the control of welding devices or machines, but to control the operation of any other form of apparatus or device, wherein it is desirable to produce periods of operation, of controlled duration, of a part and separated by periods, also of controlled duration, during which, if desired, another part may be operated. In the application of the invention to a welding apparatus, as shown in the drawings and described hereinafter, the welder is controlled to produce flow of welding current within intervals of predetermined length, during which the welder electrodes are pressed against the work, the intervals being followed and separated by intervals of release of the welder from the work, also of predetermined lengths; or, if it is desired, weld-"annealing" or weld-"cooling" periods of predetermined length during the pressure period, may be produced subsequent to each of the periods of flow of the welding current, which are followed by predetermined pressure-release periods; or, if it is desired, an intermittent current flow may be produced while maintaining pressure of the welding points on the work, which may be followed by a pressure-release period or a weld-annealing period and subsequent pressure-release period. The duration of the flow periods are controlled and separated by electrode-cooling periods of predetermined lengths to prevent injury to the electrodes by excessive heating. The regulated periods of release of the pressure of the welder electrodes from the work, afford spaced intervals of desired lengths that enable transposition of the welder from point to point along the work, or transposition of the work relative to the welder. This insures completion and perfection of each weld and produces rapidity of operation of a welder machine, or enables rapidity of manipulation of the welder by the operator, when manually manipulated.

Figure 2:
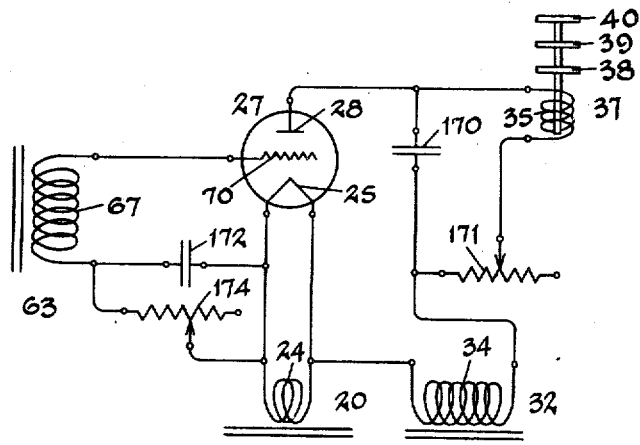
Figure 3:
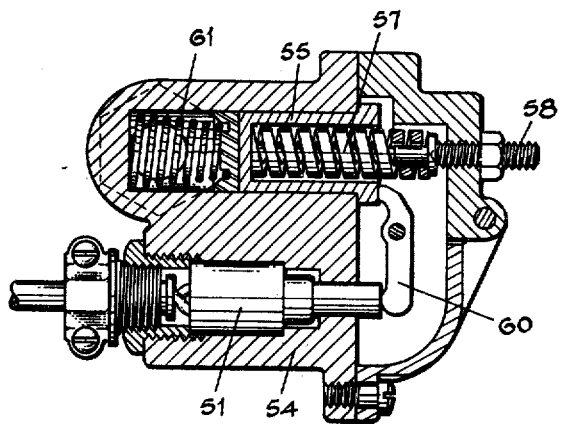

Fig. 1 illustrates an apparatus wherein the length of the welding periods of a welding apparatus and the time intervals of predetermined lengths, for transfer of the welder from point to point, are controlled by adjusted rates of flow of predetermined quantities of dielectric currents. Fig. 2 illustrates a modified form of means for controlling the dielectric currents. Fig. 3 illustrates a pressure switch for causing the flow of the welding current when the pressure rises to a welding pressure. Fig. 4 illustrates a means for controlling the length of the annealing interval during the pressure period and while the metal is at a high heat, as well as the periods of the flow of the welding current and the pressure-release period. Fig. 5 illustrates an apparatus for producing and controlling the periods of intermittent flow of the welding current to prevent overheating of the welder electrode and, also, the flow periods and the control intervals between the flow periods to produce a desired number of flow periods in each welding operation.

In the particular form of apparatus selected as an example of a practical application of the invention, and diagrammatically shown in Fig. 1 of the drawings, the welding apparatus has a pressure element for pressing the welding electrodes against the work, and an element for causing the flow of a welding current through the electrodes. The welder electrodes 1 and the welder 2 are actuated by a piston 3 to cause engagement of the work 4 by the welding points. Preferably, the fluid, through which the pressure is transmitted to the welder cylinder is in the form of a liquid that may be subjected to a high pressure by transformation of air pressure by a pneumatic-hydraulic booster 6. Whether the welder is directly operated, either pneumatically or hydraulically, or otherwise operated by fluid pressure, the pressure transmitted to produce engagement of the work 4, by the welding points 1, is controlled by an electromagnetically operated valve 7, located in a pipe 8 that is connected to a source of pressed fluid.

The welding current to the welder electrodes is produced by the flow of a current through the primary 9 of a transformer 10. The main lines 11 of a power circuit are connected to the primary 9 by a switch 15 to produce, in the secondary 16, a welding current that flows through the electrodes 1 and the work 4, against which the electrodes are pressed by the fluid pressure. The controlling circuits of the welder are connected through a switch 17 to the main lines 18 of a commercial circuit, such as a 110-volt circuit.

When the switch 17 is closed, a circuit is established through the primary 19 of a transformer 20, from the switch 17, through the supply line 21, the primary 19, to the return line 22, which induces the flow of a current in the secondary 24 of the transformer. The secondary 24 is connected to the filament 25 of an electric valve or relay 27, having an anode 28, which energizes the filament and produces a one-way electronic emission of currents that may be caused to flow in the circuit of the filament and the anode. When, therefore, it is desired to produce a weld, a switch 30, that may be mounted on the welder, is closed by the operator, which completes a circuit from the supply line 21, through the primary 31 of the transformer 32, which, in turn, induces the flow of a current in the secondary 34 of the transformer during half cycles in which the anode 28 is positive. The current flows through the filament 25, to the plate 28 and through the solenoid 35 of a primary or relay switch 37 and produces the operation of the relay, which actuates an element in the welding circuit to produce operation of the welder.

The relay 37 is provided with three movable contacts 38, 39, and 40, which coact with their associated fixed contacts to complete certain electric connections. The movable contact 39 operates to close a circuit from the supply line 21, the line 44, the solenoid 45, to the return line 22, which operates the fluid pressure valve 7 of the welder. The valve 7 directs air under pressure to the booster 5, which transforms the pneumatic pressure into a greatly increased hydraulic pressure which is transmitted through a liquid that is maintained in the pipe 47, which interconnects the booster and the welder, to press the welding electrodes 1 against the work.

To prevent incompletion of a weld, once initiated, the contact 38 of the relay 37 completes the same circuit that is completed by the switch 30, when the relay 37 closes, the switch and the contact being connected in parallel circuits when they are both closed. If the switch 30 is opened while the welder is forming a weld, the circuit through the primary 31 is maintained closed through the contact 38 to maintain the welding period. At the end of the welding period, as described below, the just-mentioned holding circuit is interrupted, so that a reclosure of switch 30 is necessary to initiate the next welding cycle or period.

The movable contact 40 of the relay switch 37 operates to complete one side of a circuit of a switch for causing the flow of the welding current, such as the welding or relay switch 48, diagrammatically shown in Fig. 1. The circuit of the contact 40 is from the supply line 21, the contact 40, to one terminal of the solenoid 50 of the welding or relay switch 48. When the pressure of the welder electrodes, against the work, rises to the required welding pressure, an adjustable pressure switch 51 is operated to complete the other side of the circuit of the solenoid 50 to the return line 22, whereupon, the relay switch 48 operates the contactor 52, which completes the power circuit from the switch 15 through the primary 9 and causes the flow of the welding current through the welding electrodes 1 and the work 4.

The pressure switch 51 is mounted in a suitable shell 54 (Fig. 3) and operated by a piston 55 counter to the pressure of a spring 57, which may be adjusted by the screw 58. Movement of the piston is transmitted to the switch 51, through the lever 60, to operate the switch when the pressure on the piston 55 reaches a predetermined point, as determined by the adjustment of the spring 57. The liquid pressure on the piston, produced by the booster 5, is transmitted through a passageway 61 and, hence, pressure that operates the welder 2 also operates the switch counter to the pressure of the spring to cause the flow of the welding current when the pressure of the welding electrodes on the work reaches a desired welding pressure.

The closure of the pressure switch 51, not only completes one side of the circuit of the welding current control relay switch 48, but also completes a branch circuit from the supply line 21, through the primary 62 of the transformer 63, the line 65, to the return line 22. The primary 62 induces the flow of a current in the secondary 67 of the transformer 63, through a resistor 68, the filament 25 of the electric relay 27, and the grid 70 of the electric relay, which is connected to the other terminal of the secondary 67. This causes accumulation of the negative charge on the grid 70, which blocks the flow of the negative electrons to the plate 28 and the flow of the current from the plate 28 to the solenoid 35 of the relay switch 37.

A variable condenser 71 is connected to the terminals of the solenoid 35 of the relay switch 37. The condenser 71 is connected in a circuit paralleling the solenoid of the relay switch 37. The resistance of the solenoid 35 is relatively high and may be varied according to the operating conditions of the apparatus. The condenser is preferably formed of a plurality of condenser parts 72, any member of which may be connected in parallel by variation in the location of a sector contact arm 74 to vary the capacity of the condenser, which may have a desired maximum capacity according to operating conditions, such as 10 or 20 microfarads. The high resistance of the solenoid or other resistance that may be located in the discharging circuit of the condenser and the potential difference of the condenser, as determined by the charging current, produces a variation of its discharge period according to its adjusted capacity. The condenser forms a discharge-controlled condenser and is so referred to herein. The condenser 71 was charged with electricity upon the initial flow of the current from the secondary 34 of the transformer 32 in an amount corresponding to the capacity of the condenser, and, consequently, the energization of the solenoid 35 is maintained by discharge of the condenser through the solenoid, which operates to maintain the movable contacts of the relay 37 in their closed position and, thus, operates to maintain the contactor 52 of the welding current relay 48 closed and the flow of the welding current through the electrodes for a predetermined timed interval, as determined by the flow of the dielectric current of the discharge-controlled condenser. The time interval, during which the relay is held closed subsequent to the closure of the pressure switch 51 is dependent upon the adjusted capacity of the condenser 71 and the resistance to the flow of the dielectric current.

At the expiration of the flow of the dielectric current from the condenser 71, the primary or relay switch 37 operates to open the circuits of the solenoids 45 and 50. Opening the circuit of the solenoid 50 immediately opens the circuit of the primary 9 and the welding current ceases to flow. Opening the circuit of the solenoid 45 closes the valve 7 and cuts off the pressure to the booster 5, which, subsequently, reduces the hydraulic pressure to the welder piston 3 and the pressure switch 51 is opened. The opening of contact 38 of relay 37 opens the previously mentioned holding circuit which parallels switch 30, and, if switch 30 is open, such action de-energizes transformer 32. A duplicate welding cycle may, of course, be initiated by reclosing switch 30.

Where it is desired to produce a series of welds along contacting areas of two pieces of the work, by a manually manipulated or machine operated welder, and in order to insure completion of each weld and to permit movement within a particular time period, means is provided for producing time periods of sufficient, though limited, lengths in which the welder may be shifted. The periods required to shift the welder may be variable due to variation in the operating conditions in connection with different "jobs" or kinds of work, which may require variation in the time interval to produce proper sequential placement of the welder at different points along the contact areas of the parts of the work, or due to different spacial relation of the parts at which the welds are to be produced, or to variation in configuration of the different kinds or parts of the work. The welding operations may be more rapidly produced by moving the welder immediately upon release of the electrodes by the welder and locating the electrodes with respect to the work to form the succeeding weld within a limited time. In a machine operated welding apparatus, a definite time is required to shift the welder or the work, one relative to the other, to produce the sequentially formed welds, and in the present system means comprising a condenser 75 are provided to prevent the initiation of a welding operation until after the expiration of a predetermined interval following a preceding welding operation.

During the initial flow of the current produced by the secondary 67 of the transformer 63, described above, a discharge-controlled condenser 75 is charged. The condenser 75 is located in a circuit paralleling that of the resistor 68 from the secondary 67 to the filament of the electric relay 27. When the relay switch 37 opens to release the electrodes from the work, the circuit of the primary 62 of the transformer 63 also is opened by the pressure switch 51. Following this action, the condenser 75 discharges at a regulated rate of flow of the dielectric current, as determined by the adjusted capacity of the condenser 75 and for a period dependent upon its capacity and the resistance of the resistor 68. The discharge of the condenser 75 maintains the grid 70 charged, which prevents flow of the current from the secondary 34 of the transformer 32 through relay 27, and consequently prevents a re-energization of the relay switch 37. The resistor 68 is connected to the filament 25 and allows the flow of a dielectric current of limited amperage and, consequently, permits gradual discharge of the condenser 75 according to its capacity and the resistance of the resistor 68 during which time the condenser maintains the grid charged and prevents the flow of the current to the solenoid 35 of the relay 37. When the condenser 75 is discharged, and providing the switch 30 is closed, the current from the secondary 34 of the transformer 32 again restores the relay switch 37, which again establishes the circuit of the welder apparatus, and the cycle of operation, as between the two apparatus, thus, continues to produce predetermined periods of welder pressure and flow of welder current and predetermined periods of release of the work from the welder pressure, as determined by the capacity of the discharge-controlled condensers 71 and 75.

Thus, the operations of the welding apparatus are performed during alternate periods of adjusted length and the welding current is caused to flow for periods of time that is necessary to produce perfect welds as may be required according to the character of the work, particularly, as to the thickness of one or both parts of the work that are welded together. During the intermediate periods, a proper, though limited, period is given to enable transposition of the welder, either manually or automatically, along the work to produce, sequentially, a plurality of welds.

In the form of apparatus illustrated in Fig. 4, the welder apparatus is controlled to produce a welding current flow period and a weld-cooling period subsequent to the current flow period and during the pressure period. The parts of the work are held clamped subsequent to current flow period while the metal of the weld is soft and until the metal hardens. This feature of the invention is particularly advantageous where one or both of the parts of the work is relatively thick and requires a flow of a welding current for a relatively long period of time, which heats portions of the metal contiguous to the welds and prevents immediate cooling, by conduction, or, where unusual pressure is required to bring parts of the work together that resiliently react to produce separation from each other, release of the work in advance of hardening or cooling of the weld often causes separation of the work at the point where the metal was softened.

When the switches 16 and 17 of the commercial and power lines are closed, a circuit is established through the primary 19 of the transformer 20, the supply line 21 and the return line 22, which induces a flow of current in the secondary 24 of the transformer. The secondary current energizes the filaments of the electric relays 77 and 78. Each relay has a filament 25, an anode 26, and a grid 70 and are connected in parallel by the lines 79 and 83. When, therefore, it is desired to produce a weld, the switch 30 is operated, which completes a circuit from the commercial line 18, through the primaries 31 and 80 of the transformers 32 and 81, which flows from the supply line 21, through the switch 30, the line 82, the primaries 31 and 80, in parallel, to the return line 22. This, in turn, induces the flow of a secondary current through the filaments 25 of the electric relays 77 and 78 and causes the emission of the electrons from the filaments. The current induced by the transformer 32 flows through the solenoid 76 of the primary or relay switch 84, which actuates an element in the welding circuit to produce operation of the welder.

The primary or relay switch 84 is provided with two movable contacts 85 and 87, which coact with their associated fixed contacts, to complete the connections in their respective circuits. The movable contact 85 operates in conjunction with its associated fixed contact to close a circuit through the supply line 21, the contact 85, the line 88, the solenoid 45 of the valve 7, to the return line 22. The solenoid 45 operates the valve 7 to direct air under pressure to the booster 5, which magnifies the air pressure and transmits the pressure, hydraulically, to the welder 2 to press the welding electrodes 1 against the work 4, and when the pressure reaches a desired welding pressure, the switch 51 is operated.

Also, the current induced by the transformer 81 flows from the secondary 90 through the filament 25, the anode 28, the solenoid 91 of a primary or relay switch 92, the line 94, to the secondary 90. Thus, the relay switch 92 is operated substantially simultaneously with the relay switch 84 to operate the movable contact 95. The contact 95, when the solenoid 91 is energized, opens a circuit through the line 98, the primary 62 of the transformer 63, to the return line 22, thereby preventing energization of transformer 63 for the time being. Closure of contact 97 of relay 92 establishes a circuit from the pressure switch 51 through the line 107, contact 95, line 97, the solenoid 50 of the welding current relay 48, to the return line 22. Hence, as in the form of apparatus diagrammatically illustrated in Fig. 1, closure of the pressure switch connects the welding-current relay 48 switch to the main lines and initiates the flow of welding current.

The pressure switch 51 also connects a circuit to the primary 100 of the transformer 101 which induces a flow of a current through the secondary 102 to charge condenser 103 and apply a blocking potential to the grid 70 of the electric relay 78, which thereupon becomes non-conducting. The solenoid 91 of the primary or relay switch 92 is, however, maintained energized by the dielectric current of the discharge-controlled condenser 104, which has been charged during the flow of the current from the secondary 90.

The condenser 105 has a variable capacity and is located in a circuit paralleling the solenoid 76, which has a high resistance, and the condenser 104 also has a variable capacity located in a circuit paralleling the solenoid 91, which also has high resistance, which operates to cause the flow of the dielectric currents of the condensers through their respective associated solenoids 76 and 91 of the primary switches and maintain their associated contacts closed for periods determined by the adjusted capacity of the condensers 104 and 105. If desired, resistors may be located in series with the solenoids 76 and 91 and the condensers to produce desired resistance to flow of the dielectric currents and the solenoids may be wound to have a low resistance. The resistors will then operate the same as the high resistance of the solenoid to produce predetermined periods of discharge according to their adjusted capacities.

When the electric relay 78 is rendered non-conducting, as aforesaid, the discharge-controlled condenser 104 maintains the relay 92 closed, which maintains the welding current switch 48 closed until the discharge-controlled condenser 104 is discharged, whereupon, the relay switch 92 is opened, which opens the welding current switch 48. The contact 95 of the relay switch 92, which recloses when relay 92 is de-energized, closes a circuit through the line 107 to the primary 62 of the transformer 63, which charges the condenser 75 and applies a blocking potential to the grid of the electric relay 77. This action causes cessation of flow of current through the electric relay 77 to the relay switch 84 and its discharge-controlled condenser 105 maintains the switch 84 closed and retains the valve 7 open and the pressure of the welding electrodes against the work until the condenser 105 is discharged, during which time the weld is annealed and cooled. This permits the metal of the work, heated by the flow of the welding current, to be cooled while subject to the pressure of the welding electrodes, whereupon, the primary switch 84 is opened.

If it is desired to vary the period of flow of the welding current, which frequently occurs where there is a difference in the thickness of the metal in the parts of the work that are to be welded together, a variable capacity is located in the circuit paralleling the solenoid 91. Any number of parts of the condenser, each of which may have a variable capacity, may be connected in parallel with the condenser 104 and controlled by a suitable switch. If desired, the switches may be operated by the operator when the weld is about to be formed in parts of the work requiring longer periods of current flow than normal to produce the weld or the switches may be automatically operated when machine welding. In Fig. 4 is shown a manually operable switch 108 that is located on the welder to increase the quantity of stored electricity and vary the coulombs discharged through the solenoid of the relay switch 92. The switch 108 connects a discharge-controlled condenser part 110, in parallel relation, to the discharge-controlled condenser part 104 through the lines 111 and 112. Thus, upon completion of the flow of the welding current, the relay 92 will be retained closed by the dielectric current flowing from both of the condenser parts 104 and 110 for a period, dependent upon the total capacity of the variable discharge-controlled condenser, formed by the condenser parts 104 and 110.

Upon the completion of the discharge of the condenser 105, the relay switch 84 is opened, which closes the valve 7 and exhausts air from the booster and reduces the hydraulic pressure in the connection between the booster and the welder and opens the pressure switch 51.

The primary or relay switch 84, also, through its control of the fluid pressure switch 51, opens the circuits of the primary windings 62 and 100. The latter action enables condenser 103 to discharge, without substantial time lag, through resistor 106 and remove the blocking potential from the grid of relay 78, thereby conditioning relay 78 for the next successive welding cycle. Upon de-energization of transformer 63, the discharge-controlled condenser 75 is enabled to discharge through the resistor 68, but maintains the grid 70 charged negatively for a period dependent upon the capacity of the condenser. This action prevents closure of the relay switch 84, if the switch 30 is retained closed, for a predetermined "off" period, during which the welder may be shifted to the point along the work where the succeeding weld is to be made.

Upon cessation of the flow of the dielectric current from the condenser 75, the grid 70 ceases to be charged. Thus, if the switch 30 is closed, current from the secondary 34 is caused to again flow through the circuit of the electric relay 77 and the solenoid 78, hereby again operating the relay switch 84 to initiate a succeeding welding operation.

The cycles of the welding apparatus and the control apparatus, thus, continue until the switch 30 is opened, and, if opened before the completion of a welding operation, the contact 87 of the relay 84, which is located in a circuit parallel to that of the switch 30, maintains the operation of the two apparatus until the weld is completed, whereupon, the welder may be removed from the work, or the work may be removed from a welding machine, if the work is machine-welded.

In the form of apparatus illustrated in Fig. 5, means is provided for producing intermittent flow of the welding current. Where the welding electrodes of a welding apparatus are caused to press against the work to produce a weld that requires the flow of a welding current for a relatively long period of time, the heat, produced by the flow of the current through the resistance, causes softening of the metal of the welding electrodes, although the electrodes may be water-cooled, and the high pressure of the electrodes against the work causes the electrodes to mushroom or flatten at their ends, which quickly shortens them and renders them inefficient in producing subsequent welds. Intermittent flow of the welding current through the electrodes and the work enables the cooling water to maintain the electrodes at a low temperature.

The apparatus, shown in Fig. 5 is connected to the power lines and the commercial lines, by the switches 15 and 17. The switch 17 closes the circuit of the primary 19 of the transformer 20 and induces a current in the secondary 24 to energize the filaments of the electric relays 77, 78, and 114 through the lines 115 and 117. The switch 17, also, completes a circuit through the line 21, the movable contact 125 of the relay 122, the primary 127 of the transformer 128, to the line 22 and, also, the switch 17 connects the primary 160 of the transformer 161 with the lines 21 and 22 which produces flow of a current through the solenoid 132 of the relay 140 and the tube 114, except when the electronic tube 114 is rendered non-conductive by the grid 144. The switch 30, located on the welder 2, is then operated. The switch 30 closes the circuit of the primary 31 of the transformer 32 and a current flows through the primary 31, which induces the flow of a current from the secondary 34, through the relay 77, and the solenoid 76 of the primary relay switch 84 and operates the relay 84 to cause the movable contacts 85 and 87 to close their respective circuits. The contact 85 operates to close the circuit to operate the valve 7 and open the connection of the booster 5 with the source of supply of air under pressure, to press the welding electrodes of the welder 2 against the work 4, as in the form of apparatus shown in Figs. 1 and 4. When the pressure of the welding points against the work reaches a predetermined point, as determined by the adjustment of the pressure switch 51, the circuit through the welding current control relay switch 48 is completed by the operation of the primary or relay switch 92, as follows:

When the circuit through the pressure switch 51 is closed by the pressure of the liquid transmitted from the booster to the welder, a circuit is completed, through the lines 118 and 120 to the primary 80 of the transformer 81, and thence to the return line 22. The primary 80, operating through the secondary 90, causes the flow of a current through the solenoid 91 of the primary or relay switch 92 to close the contact 95, as described in connection with the form of apparatus illustrated in Fig. 4.

The contact 95 closes a circuit from the pressure switch 51, the line 118, through the now closed movable contact 145, of the primary or relay switch 140, the line 147, the contact 95 of the relay switch 92, to the line 148, where the circuit of the movable contacts 145 and 95 divides into two branch circuits. The contact 145 remains closed for a time controlled by the condenser 131 and determines the over-all length of the welding period, which action is described below. In one of the just mentioned branch circuits, the welding current relay 48 is located and, in the other of the branch circuits, the primary 150 of the grid-charging transformer 151 is located. The relay 48 and the primary 150 are connected to the return line 22. The operation is such that the welding-current relay 48 is closed when the pressure switch 51 is closed. The relay 48 closes the circuit of the primary 9 of the transformer 10 and causes the welding current to be produced in the secondary 16 and flow through the welding electrodes and the work, and the primary 150 induces the flow of a current through the secondary 152, which charges the grid 154 and the discharge-controlled condenser 155. The condenser has a resistor 157, which is connected in parallel with the condenser.

The grid 154, when charged, interrupts the flow of the current through the solenoid 91 of the primary or relay switch 92, but the discharge-controlled condenser 104 maintains the contact 95 of the relay 92 closed and maintains the circuit through the welding-current relay switch 48 and the primary 150 closed and, consequently, maintains the flow of the welding current for a period of time, dependent upon the capacity of the condenser 104 as modified by the resistance of the solenoid 91, as in Fig. 4. When the dielectric current from the condenser 104 ceases to flow, the circuits through the welding-current 48 and the primary 150 are opened. The circuits are allowed to remain open a short interval of time to allow the welding electrodes to cool.

The circuit of the primary 150, being opened by the operation of the contact 95, is retained open by the negative charge on the grid 154 as long as the dielectric current from the condenser 155 flows through the resistor 157, during which time the electrodes cool. When the dielectric current of the condenser 155 ceases to flow, the current from the secondary 90 of the transformer 81 again flows through the solenoid 91 of the relay 92 to close the contact 95 and restore the circuit from the main line through the welding-current relay 48 and the primary 150 of the transformer 151, which again causes the flow of the welding current through the welding points and the discontinuance of the flow of the current from the secondary 90 of the transformer 81, but the contact 95 is again retained closed by the flow of the dielectric current from the discharge-controlled condenser 104, during which time the welding current flows. When the condenser 104 is discharged, the contact 95 again opens the circuit of the welding-current relay 48 and the primary 150, which again affords a period of cooling of the electrodes. Thus, regulated alternate periods of flow of the welding current and of cooling the electrode are produced.

The initial closure of the line switch 17 completes an obvious circuit including conductors 21, normally closed contacts 125 of relay 122 and conductor 130 for the primary winding of grid transformer 128, associated with electric relay 114, thereby enabling the secondary winding 141 thereof to charge condenser 131 and apply a blocking potential to the grid 144 of relay 114. The closure of the pressure switch 51, which resulted, as previously described, from the closure of the starting switch 30, also completes a circuit through conductors 21 and 120 for the winding 121 of relay 122, and upon completion of this circuit, relay 121 is energized to open the previously mentioned contacts 125. This action interrupts the energizing circuit for the transformer 128, enabling the previously charged condenser 131 to start discharging through the local circuit including resistor 142. After a predetermined discharge period, which is adjustable by means of the commutator associated with condenser 131, the grid 144 of relay 114 attains a potential at which it renders this relay conducting. At this time, transformer 161 is enabled to pass current through relay 114 and energize relay 140, which thereupon opens contact 145 and closes contact 165. It will be understood that the timing period provided by condenser 131 is long enough to allow a desired number of energizations and de-energizations of relay 92, thereby causing the delivery to the welding circuit of a succession of impulses during the over-all timing period provided by condenser 131. The opening of contacts 140 opens the circuit through the movable contact 95 and the branched circuit of the welding-current relay 48 and the primary 150 of the transformer 151, and, consequently, the intermittent flow of the welding current is discontinued.

The opening of contacts 140 also opens the circuit of the primary winding 150 of transformer 151, which action terminates the successive energizations and de-energizations of the impulsing relay 92.

In accordance with the previous embodiments, the condenser 105 is utilized to retain the switch 84 closed for a short cool-time period after the interruption of the flow of welding current and the closure of contacts 165 of relay 140 is used to render switch 84 subject to the action of condenser 105. Closure of contacts 165 completes a circuit through the pressure switch 51 and conductors 118 and 167 for the primary winding 62 of transformer 63 associated with electronic relay 77. This causes the secondary 67 to charge the condenser 75 and apply a blocking potential to the grid of its associated electric relay 77, and thus discontinues the flow through the solenoid 76 which thereupon opens the circuits through the movable contacts 85 and 87. Inasmuch as the valve 7 is controlled by the movable contact 85, the circuit of the solenoid 45 is opened and the valve is closed and the booster is exhausted, which reduces the hydraulic pressure in the connection between the booster and the welder.

When the pressure is reduced to a predetermined point, as determined by the adjustment of the pressure switch 51, the switch is opened and the work is released. Opening of the pressure switch opens the circuit of the primary 62. The welder then may be shifted along the work to a point where the succeeding weld is to be produced.

The time interval allowed for the shifting of the welder is dependent upon the discharge-controlled condenser 75, during which the dielectric current maintains the charge of the grid of the electronic relay 77. When the dielectric current ceases to flow, and assuming switch 30 is still closed, the relay switch 84 is again operated by the current produced by the secondary 34 of the transformer 32, whereupon, the succeeding weld is produced, and during the welding operation, the current is caused to flow intermittently by the repeated closure and opening of the relay switch 92, and due to the intermittent charge and controlled discharge of the condensers 104 and 155 and for a total period, as determined by the discharge-controlled condenser 131, at the expiration of which the primary or relay switch 140 opens the circuit to the welding-current relay 48. When the contact 165 of the relay switch 140 closes the circuit through the line 167 to the primary 62, the flow from the secondary 34, through the solenoid 76 of the relay switch 84, is discontinued, but the contacts 85 and 87 are retained closed by the dielectric current from the condenser 105, during which period, the pressure of the welding electrodes 1 on the work is maintained while the heated metal of the weld is cooled. Upon cessation of the flow of the dielectric current from the condenser 105, the primary or relay switch 84 is opened to disconnect the solenoid 45 and close the valve 7 and exhaust the booster 5 to release the work for the period of discharge of the condenser 75, during which the welder or the work may be shifted, one relative to the other, in advance of making the succeeding weld. The relay switch 84 is again closed and the cycles of operation of the welding apparatus and the control apparatus continues until the switch 30 is opened, if opened during the period that the work is released from the pressure of the welder. Otherwise, the circuit through the contact 87, which parallels the circuit of the switch 30, causes continuance of the cycle of the control apparatus until the work is released, as in the apparatus shown in Figs. 1 and 4. Thus, in the cycle of operations that are produced by the welder apparatus and the control system, sequential welding operations may be performed by the welding apparatus to produce predetermined periods of current flow, separated by predetermined periods during which the electrodes are cooled followed by periods of predetermined lengths during which the welds are annealed and cooled while under pressure.

If desired, the time periods may be controlled by sequential discharge of condensers of fixed relative large capacities through variable resistors instead of the sequential discharge of condensers of variable capacity through resistors having a fixed resistance. For example, the condenser 170 (Fig. 2), that maintains the primary switch 37 closed upon the flow of the current induced in the secondary 67 that charges the grid 70, is one having a fixed capacity, but discharges through a variable resistor 171, and the condenser 172, that is charged by the current induced in the secondary 67 of the transformer 63, maintains the grid charge upon cessation of the flow of secondary current to maintain the primary switch 37 open for a period dependent upon the discharge of the condenser through the variable resistor 174, whereupon, the primary switch 37 may be again closed by the current induced in the secondary 34 of the transformer 32, which may, at the same time, close or cause the closure of the secondary current inducing circuit of the transformer 63 unless the circuit is otherwise interrupted, as in the form of apparatus shown in Fig. 1. The discharge-controlled condensers of the form shown in Fig. 2 may be used to accomplish the same adjustable periods of current flow from the condensers as the discharge-controlled condensers shown in Figs. 1, 4 and 5.

Also, if desired, any of the solenoids energized by the dielectric currents may have the desired high resistance to control the discharge rate of an associated condenser, such as the solenoids 35 and 91 of Figs. 1, 4, and 5, unless the high resistance of the solenoid is detrimental to its operation in connection with other control elements of the system.

I claim:

1. In a control system, the combination of a translating means, an electric valve having an anode circuit and a control electrode, means rendering said translating means operably responsive to flow of current in said anode circuit, means for maintaining said translating means in an operated condition for a first period of predetermined length when the same has been initially operated by said anode current, and means effective as a consequence of said flow of current in said anode circuit and after said initial operation of said translating means for applying a blocking potential to said control electrode to prevent re-operation of said translating means by flow of current in said anode circuit for a second period of predetermined length.

2. In a control system, the combination of a translating means, an electric valve having an anode circuit and a control electrode, means rendering said translating means operably responsive to flow of current in said anode circuit, means for maintaining said translating means in an operated condition for a first period of predetermined length when the same has been initially operated by said anode current, and means rendered effective by said initial operation of said translating means for applying a blocking potential to said control electrode to prevent re-operation of said translating means by flow of current in said anode circuit for a second period of predetermined length.

3. In a control system, the combination of a translating means, an electric valve having an anode circuit and a control electrode, means rendering said translating means operably responsive to flow of current in said anode circuit, timing means energized by flow of current in said anode circuit for maintaining said translating means in an operated condition for a first period of predetermined length when the same has been initially operated by said anode current, and additional timing means rendered effective by said initial operation of said translating means for applying a blocking potential to said control electrode to prevent re-operation of said translating means by flow of current in said anode circuit for a second period of predetermined length.

4. In a control system, the combination of a translating means, an electric valve having an anode circuit and a control electrode, means connecting said translating means and a source of power in said anode circuit whereby flow of current in said anode circuit operates said translating means, energy storing means and means associated therewith for charging the same by flow of current in said anode circuit, said energy storing means maintaining said translating means in operated condition for a first period of predetermined length after interruption of said anode current, and means comprising additional energy storing means operably responsive to said operation of said translating means for applying a blocking potential to said control electrode and interrupting said anode current for a second period of predetermined length, whereby to prevent re-operation of said translating means by flow of anode current during said second period.

5. In a control system for causing on and off timing intervals of an element, the combination of a translating device effective while in an operated condition to afford said on timing interval and effective while in an unoperated condition to afford said off timing interval, an electric valve having an anode circuit and a control electrode, means connecting a source of power and said translating means in said anode circuit, control means for energizing said source of power to thereby initiate a flow of current in said anode circuit and effect an operation of said translating means, energy storing means and means associated therewith for charging the same by flow of said anode current, said energy storing means maintaining said translating means in the operated condition during the remainder of said on timing interval, and additional energy storing means rendered effective by said operation of said translating means for applying a blocking potential to said control electrode so as to interrupt said flow of anode current and provide said off timing interval after the expiration of said on timing interval, whereby to prevent re-operation of said translating means by said flow of anode current during said off timing interval.

6. In a control system, the combination of a translating means, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, and means effective after initial operation of said translating means by said plate current for applying a blocking potential to said control electrode so as to interrupt said flow of anode current and render said translating means entirely subject to said energy storing means.

7. In a control system, the combination of a translating means, an electric valve having an anode circuit and a control electrode, means connecting a source of power and said translating means in said anode circuit so as to effect an operation of said translating means by flow of current in said anode circuit, energy storing means connected in said anode circuit and operative after interruption of said anode current to maintain said translating means in an operated condition for a predetermined period, and means rendered effective after said operation of said translating means to apply a blocking potential to said control electrode whereby to interrupt said anode current and render said translating means entirely subject to said energy storing means.

8. In a control system, the combination of a first control circuit and a second control circuit, interlocking means preventing closure of said second control circuit except while said first control circuit is closed, timing means for controlling the closure of said first control circuit comprising an electric valve having an anode circuit and a control electrode, a translating means connected in said anode circuit and operably responsive to flow of current therein for causing closure of said first control circuit, energy storing means connected in said anode circuit and effective to maintain said translating means operated for a predetermined period, means rendered effective by operation of said translating means for applying a blocking potential to said control electrode so as to interrupt said flow of anode current for a predetermined second interval and prevent re-operation of said translating means throughout said second interval, timing means operatively associated with said second circuit for controlling flow of current therein and comprising an electric valve having an anode circuit and a control electrode, translating means connected in said last mentioned anode circuit and operably responsive to flow of anode current therein to cause closure of said second control circuit in the event said first control circuit is closed, energy storing means associated with said second-mentioned anode circuit and operative to maintain said second-mentioned translating means in operated condition for a predetermined interval, and means rendered effective by operation of one of said translating means for applying a blocking potential to said second-mentioned control electrode so as to render said second-mentioned translating means entirely subject to action of said second-mentioned energy storing means.

9. In a control system, the combination of a translating means to be maintained in operated condition during an on period and in an unoperated condition during an off period, an electric valve having an anode circuit and a control electrode, means rendering said translating means operably responsive to flow of current in said anode circuit, adjustable means operable independently of continued flow of said anode current for maintaining said translating means in an operated condition for a first period of predeterminedly adjustable length when the same has been initially operated by said anode current, and adjustable means effective after said initial operation of said translating means for applying a blocking potential to said control electrode to prevent re-operation of said translating means by flow of current in said anode circuit for a second period of predeterminedly adjustable length.

10. In a control system for operation from an alternating current source of predetermined periodicity, the combination of a translating means, an electric valve having an anode circuit and a control electrode, means rendering said translating means operably responsive to flow of current in said anode circuit, means for maintaining said translating means in an operated condition for a first period comprising a predetermined plural number of periods of said source when the same has been initially operated by said anode current, and means effective after said initial operation of said translating means for applying a blocking potential to said control electrode to prevent re-operation of said translating means by flow of current in said anode circuit for a second period comprising a predetermined number of periods of said source.

11. In a control system, the combination of an electromagnetically operated relay, an electric valve having an anode circuit and a control electrode, means rendering said relay operably responsive to flow of current in said anode circuit, means for maintaining said relay in operated condition for a first period of predetermined length after the same has been initially operated by said anode current, and means effective after said initial operation of said translating means for applying a blocking potential to said control element to prevent re-operation of said relay by flow of current in said anode circuit for a second period of predetermined length.

12. In a control system, the combination of a translating means, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, and timing means effective at the expiration of a controlled timing period after said initial operation of said translating means by said anode current for applying a blocking potential to said control electrode so as to interrupt said flow of anode current and render said translating means entirely subject to said energy storing means.

13. In a control system for controlling the continuity of first and second electric circuits, the combination of a translating means effective while in an operated condition to close said first circuit, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, and means including timing means operable to cause closure of said second circuit for a controlled period after said translating means has been initially operated by said anode current, said last mentioned means being effective at the expiration of said controlled period to apply a blocking potential to said control electrode so as to interrupt said flow of anode current and render said translating means entirely subject to said energy storing means.

14. In a control system, the combination of a translating means, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, timing means comprising a second electric valve having an anode circuit and a second translating means operably responsive to flow of current therein, and means rendering said second translating means effective at the expiration of a controlled timing period after said first translating means has been initially operated by said anode current to apply a blocking potential to said control electrode so as to interrupt said first mentioned flow of anode current and render said first mentioned translating means entirely subject to said energy storing means.

15. In a control system for controlling the continuity of first and second electric circuits, the combination of a translating means effective while in an operated condition to close said first circuit, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, means including timing means operable to cause closure of said second circuit for a controlled timing period after said translating means has been initially operated by said anode current, said last mentioned means including a second electric valve having an anode circuit and a second translating means operably responsive to flow of current therein, and means rendering said second translating means effective at the expiration of said timing period to apply a blocking potential to said control electrode so as to interrupt said first mentioned flow of anode current and render said first translating means entirely subject to said energy storing means.

16. In a control system, the combination of a translating means, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, and timing means rendered effective by operation of said translating means for applying, at the expiration of a controlled timing period after such operation, a blocking potential to said control electrode so as to interrupt said flow of anode current and render said translating means entirely subject to said energy storing means.

17. In a control system for controlling the continuity of first and second electric circuits, the combination of a translating means effective while in an operated condition to close said first circuit, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, and means including timing means rendered effective by operation of said translating means to cause closure of said second circuit for a controlled period, said last mentioned means being effective at the expiration of said controlled period to apply a blocking potential to said control electrode so as to interrupt said flow of anode current and render said translating means entirely subject to said energy storing means.

18. In a control system, the combination of a translating means, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, timing means comprising a second electric valve having an anode circuit and a second translating means operably responsive to flow of current therein, means effective at the expiration of a predetermined timing period after said first translating means has been initially operated to cause a flow of anode current through said second valve and operate said second translating means, and means rendering said second translating means effective upon operation to apply a blocking potential to said control electrode so as to interrupt said first mentioned flow of anode current and render said first mentioned translating means entirely subject to said energy storing means.

19. In a control system for controlling the continuity of first and second electric circuits, the combination of a translating means effective while in an operated condition to close said first circuit, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, means including timing means operable to cause closure of said second circuit for a controlled timing period after said translating means has been initially operated by said anode current, said timing means including a second electric valve having an anode circuit and a second translating means operably responsive to flow of current therein, means effective at the expiration of a predetermined timing period after said first translating means has been initially operated to cause a flow of anode current through said second valve and operate said second translating means, and means rendering said second translating means effective upon operation to apply a blocking potential to said control electrode so as to interrupt said first mentioned flow of anode current and render said first mentioned translating means entirely subject to said energy storing means.

20. In a control system, the combination of a translating means, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, timing means comprising a second electric valve having an anode circuit and a second translating means operably responsive to flow of current therein, control means for causing a flow of anode current through said second valve to thereby operate said second translating means and for thereafter interrupting such flow of anode current, and timing means for maintaining said second translating means in an operated condition for a predetermined timing period, said second translating means being effective at the expiration of said timing period to apply a blocking potential to said control electrode so as to interrupt said first mentioned flow of anode current and render said first mentioned translating means entirely subject to said energy storing means.

21. In a control system for controlling the continuity of first and second electric circuits, the combination of a translating means effective while in an operated condition to close said first circuit, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, means including timing means operable to cause closure of said second circuit for a controlled timing period after said translating means has been initially operated by said anode current, said last mentioned means including a second electric valve having an anode circuit and a second translating means operably responsive to flow of current therein, control means for causing a flow of anode current through said second valve to thereby operate said second translating means and for thereafter interrupting such flow of anode current, and timing means for maintaining said second translating means in an operated condition for a predetermined timing period, said second translating means being effective at the expiration of said timing period to apply a blocking potential to said control electrode so as to interrupt said first mentioned flow of anode current and render said first mentioned translating means entirely subject to said energy storing means.

22. In a control system, the combination of a translating means, an electric valve having an anode circuit and a control electrode, means rendering said translating means operably responsive to flow of current in said anode circuit, adjustable means operable independently of continued flow of said anode current for maintaining said translating means in an operated condition for a first period of predeterminably adjustable length when the same has been initially operated by said anode current, adjustable timing means effective at the expiration of a controlled timing period after said initial operation of said translating means for applying a blocking potential to said control electrode thereby rendering said translating means subject to said first mentioned adjustable means, and timing means for maintaining said blocking potential for a second period of predeterminably adjustable length to thereby prevent re-operation of said translating means by flow of current in said anode circuit during such second period.

23. In a control system, the combination of a translating means, an electric valve having an anode circuit and a control electrode, means rendering said translating means operably responsive to flow of current in said anode circuit, adjustable means operable independently of continued flow of said anode current for maintaining said translating means in an operated condition for a first period of predeterminably adjustable length when the same has been initially operated by said anode current, adjustable timing means effective at the expiration of a controlled timing period after said initial operation of said translating means for applying a blocking potential to said control electrode thereby rendering said translating mean subject to said first mentioned adjustable means, timing means for maintaining said blocking potential for a second period of predeterminably adjustable length to thereby prevent re-operation of said translating means by flow of current in said anode circuit during such second period, said timing means comprising a second electric valve having an anode circuit and a second translating means responsive to flow of current therein, and means rendering said second translating means effective to apply said blocking potential.

24. In a control system for controlling the continuity of first and second electric circuits, the combination of a translating means effective while in an operated condition to close said first circuit, an electric valve having an anode circuit and a control electrode, means rendering said translating means operably responsive to flow of current in said anode circuit, energy storing means and means associated therewith for charging the same by flow of current in said anode circuit, said energy storing means maintaining said translating means in an operated condition for a predetermined period when the same has been initially operated by said anode current, impulsing means and timing means associated with said second circuit, said impulsing means being effective after said translating means has been initially operated to cause periodic opening and closing of said second circuit, said timing means being effective, at the expiration of a controlled timing period after said translating means has been initially operated, to cause interruption of said second circuit and to apply a blocking potential to said control electrode so as to interrupt said flow of anode current and render said translating means entirely subject to said energy storing means.

25. In a control system for causing periodic operation of a translating means, an electric valve having an anode circuit and a control electrode, means rendering said translating means operably responsive to flow of current in said anode circuit, means for maintaining said translating means in an operated condition for a first period of predetermined length when the same has been initially operated by said anode current, and means operated by said operation of said translating means for applying a blocking potential to said control electrode to thereby interrupt further flow of current in said anode circuit, said last-mentioned means including timing means for maintaining said blocking potential for a second period of predetermined length at the expiration of which current is again enabled to flow into said anode circuit and effect a re-operation of said translating means.

CLETUS J. COLLOM.

CERTIFICATE OF CORRECTION.

Patent No. 2,289,320.  July 7, 1942.

CLETUS J. COLLOM.

It is hereby certified that error appears in the printed specification of the above numbered patent requiring correction as follows: Page 7, second column, line 56, claim 6, for the word "plate" read --anode--; and that the said Letters Patent should be read with this correction therein that the same may conform to the record of the case in the Patent Office.

Signed and sealed this 1st day of September, A. D. 1942.

(Seal.)

Henry Van Arsdale,
Acting Commissioner of Patents.